Feb. 27, 1923.
H. B. KIMMEL
SAW
Filed Oct. 17, 1921
1,447,137
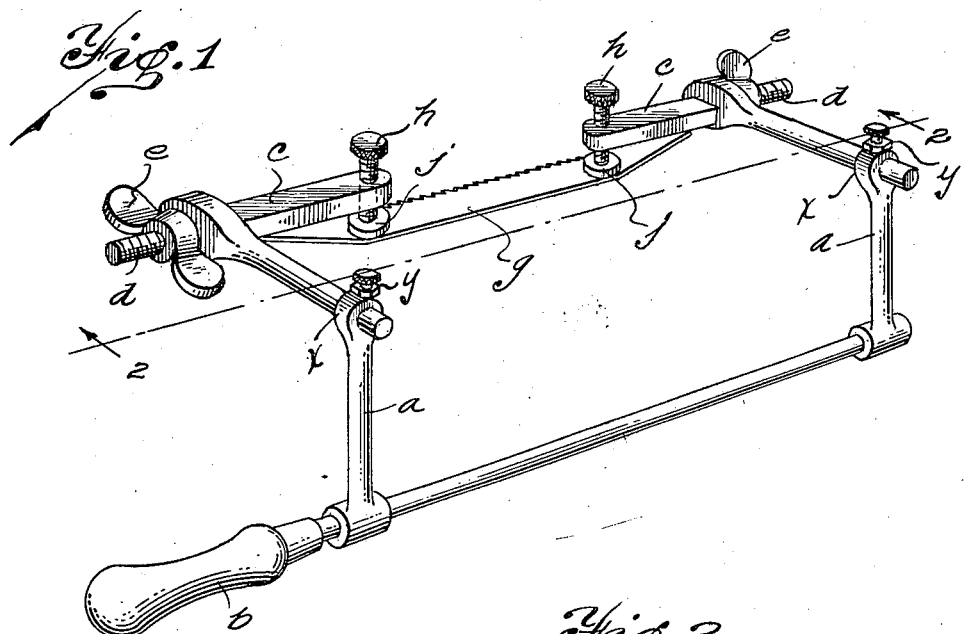
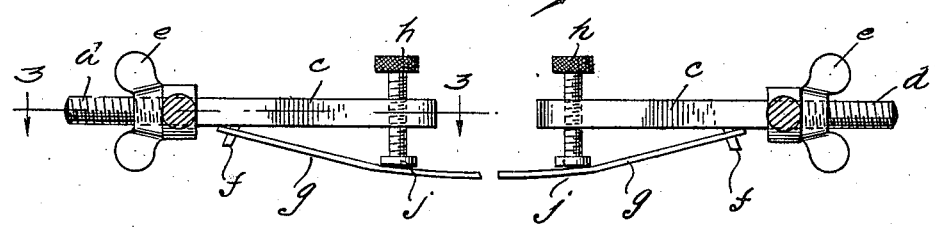
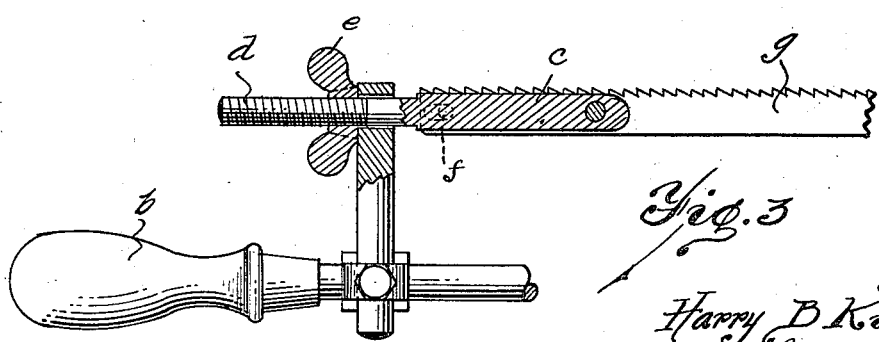
Inventor
Harry B Kimmel
By Stuart C Barnes
Attorney Patented Feb. 27, 1923.

1,447,137

UNITED STATES PATENT OFFICE.

HARRY B. KIMMEL, OF HIGHLAND PARK, MICHIGAN.

SAW.

Application filed October 17, 1921. Serial No. 508,280.

*To all whom it may concern:*

Be it known that I, HARRY B. KIMMEL, a citizen of the United States, residing at Highland Park, in the county of Wayne and State of Michigan, have invented certain new and useful Improvements in Saws, of which the following is a specification.

This invention relates to hack saws and saws of a similar nature. It has for its object a hack saw that is especially designed to reach work in otherwise inaccessible places. For instance, channel steel is very common construction to-day both in building construction and in automobile chassis. Very often it is desirable to cut off the head of a bolt or rivet which is on the inside of a channel flange. It is not possible to reach this with an ordinary hack saw. The usual method of removing the bolt or rivet is to use a cold chisel. This is very unsatisfactory especially when it is desired to hold the size of the hole or prevent mutilation of threads. Ordinarily when a chisel is used the side thrust is bound to enlarge the hole or mutilate the threads.

My improvement combines both a suitable adjustable frame for carrying the saw blade over the channel flange and also is provided with means by which the saw blade may be bowed to bring it directly into contact with the channel flange so as to cut the bolt head or other work flush with the inside of the channel flange.

In the drawings,—

Fig. 1 is a perspective of the saw.

Fig. 2 is a section on the line 2—2 of Fig. 1.

Fig. 3 is a section on the line 3—3 of Fig. 2.

The saw frame is a yoke with right angular elbows $a$ forming the yoke arms. These have extensible fore arms by reason of the fore arms passing through the rings $x$ and the providing of the set screws and lock nuts $y$. Instead of the handle $b$ being substantially in line with the blade, as is ordinarily the case, the handle is in line with the body or back of the yoke.

On the ends of the elbows are a pair of slides or blade-supporters $c$ which are squared where they contact the opening through the ends of the yoke elbows. This prevents these slides from turning. The ends of the slides are cylindrical and screw-threaded as at $d$. Onto these screw the wing nuts $e$. These slides are provided with the usual tilted-back studs $f$ over which the ends of the saw blade $g$ hook. This construction of the hack saw frame with the handle in line with the back of the yoke and the yoke arms in the form of elbows permits the inside of the channel to be reached to cut a stud, bolt or other member attached to the flange.

To further enlarge the range of the usefulness of the saw so that the stud may be cut clean and flush with the flange, I provide screws $h$ on the ends of the slide $c$. These are provided with disks $j$ on their ends which bear against the side of the saw blade $g$ and consequently bows it down, as clearly shown in Fig. 2. This brings the working portion of the saw blade below the set screws so that it lets the saw blade rest directly on the inside of the flange so as to cut the stud or other work off substantially flush with the flange.

What I claim is:

1. A hack or similar saw, having in combination, a yoke-like frame with laterally-projecting elbow arms, a flexible saw blade supported under tension between the ends of the arms, and a handle connected with the yoke at a point removed from the ends of the yoke arms.

2. A hack or similar saw, having in combination, a yoke provided with a pair of laterally-projecting elbow-like arms, a flexible saw blade supported under tension between the ends of the arms, and a handle substantially in line with the back of the yoke.

3. A hack or similar saw, having in combination, a frame comprising a yoke provided with arms in the form of laterally-projecting angular elbows having extensible fore arms, a flexible saw blade supported under tension between the ends of the arms, and a handle remote from the ends of the yoke arms.

4. A hack saw, having in combination, a yoke-like frame, one or more slides passing laterally through the ends of the yoke-like frame, means for adjusting the slide or slides with respect to the ends of the frame, and means on the end of the slides for engaging the saw to bow the same out, for the purpose specified.

5. A hack or similar saw, having in combination, a yoke-like frame, a pair of blade supporters carried on the ends of the yoke, one of which is adjustable through the yoke end, means for so adjusting the blade supporter, a blade having its ends connected with the blade supporters, and adjustable means on the ends of the blade supporters and engaging intermediate portions of the saw blade to bow the same out materially beyond the yoke frame ends.

6. A hack or similar saw, having in combination, a yoke-like frame, blade supporters passing through the ends of the yoke-like frame, a saw connected at its ends to the blade supporters, means for adjusting one of the blade supporters through the end of the yoke-like frame, and set screws on the ends of the blade supporters which may be adjustable through the blade supporters and engage intermediate portions of the blade to bow the same out.

In testimony whereof I affix my signature.

HARRY B. KIMMEL.